F. B. ALLDREDGE.
UNIVERSAL COMPOUND WORM STEERING GEAR.
APPLICATION FILED MAY 6, 1918.
1,299,532.
Patented Apr. 8, 1919.
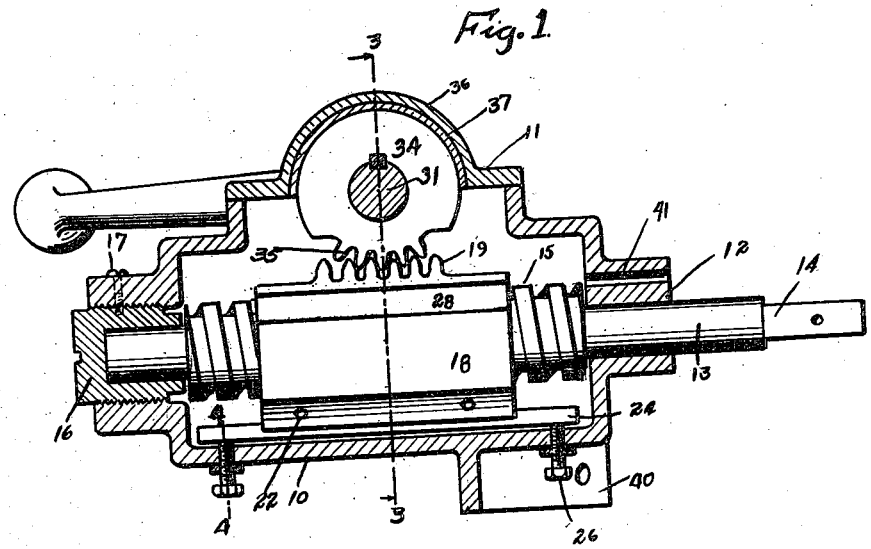
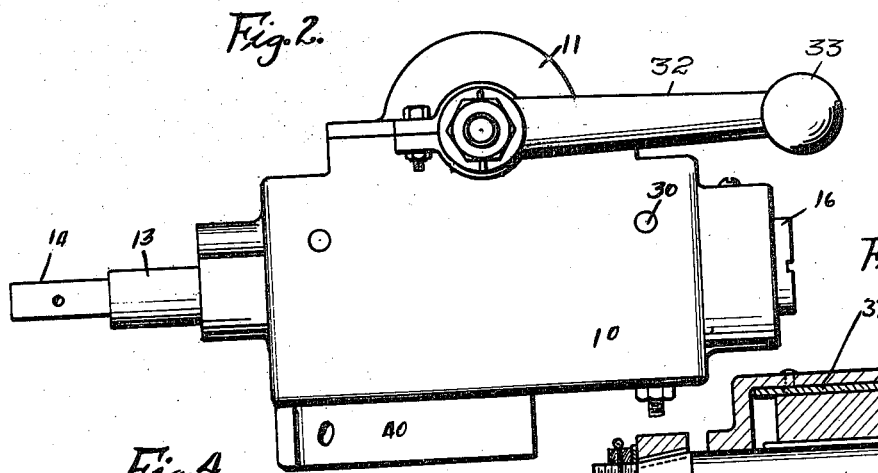
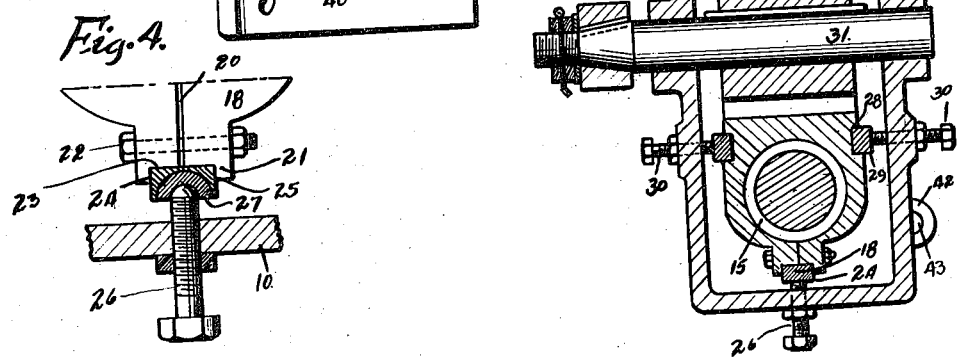
Witness
W. H. Richmond
Inventor
Francis B. Alldredge.
By Orwig and Bair

UNITED STATES PATENT OFFICE.

FRANCIS B. ALLDREDGE, OF DES MOINES, IOWA.

UNIVERSAL COMPOUND WORM STEERING-GEAR.

1,299,532.   Specification of Letters Patent.   Patented Apr. 8, 1919.

Application filed May 6, 1918. Serial No. 232,977.

*To all whom it may concern:*

Be it known that I, FRANCIS B. ALLDREDGE, a citizen of the United States, and resident of Des Moines, in the county of Polk and State of Iowa, have invented a certain new and useful Universal Compound Worm Steering-Gear, of which the following is a specification.

The object of my invention is to provide a universal compound worm steering gear of simple, durable and inexpensive construction.

A further object is to provide such a steering gear of the type using a sleeve or nut mounted on a worm or threaded portion on a steering rod, and adapted to travel longitudinally of the steering rod when the steering rod is rotated, and having a rack bar adapted to coact with a toothed sector on a shaft which operates the steering arm.

Still a further object is to provide such a device in which the threaded portion of the steering rod is formed on a rod designed to be suitably connected with the main portion of the steering rod, as, for instance, by a suitable universal joint.

Still a further object is to provide in such a steering gear suitable means for holding the slidable sleeve or nut against any rocking motion on the steering rod, and for taking up side thrust, which means are adjustable for maintaining the parts in their proper positions and taking up any looseness which may result from wear or use, so that the device may be readily and easily adjusted to prevent any undesirable play of the parts that might occur as the result of continued use.

Still a further object is to provide such a device in which the sleeve or nut is capable of adjustment for taking up any play between the sleeve and the threaded portion of the steering rod.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of the mechanism of my improved steering gear, the casing being shown in cross section.

Fig. 2 shows an inverted plan view of the device.

Fig. 3 shows a sectional view taken on the line 3—3 of Fig. 1, and

Fig. 4 shows a detail, sectional view, taken on the line 4—4 of Fig. 1.

In the accompanying drawings, I have used the reference numeral 10 to indicate generally the casing, preferably cast of malleable iron, in which the operative parts of the steering gear mechanism, except the steering arm, are supported. At one side the casing has a detachable member 11.

Formed at one end of the casing 10 is a suitable bearing 12 for one end of the short shaft 13, which forms a part of the steering rod and is designed to be connected with the main portion of the steering rod at the end 14 by a suitable joint. The portion of the shaft 13 within the casing 10 is enlarged and is provided with screw threads 15.

At the opposite end of the shaft 13 is a cylindrical portion which is received in a suitable bearing formed in a screw plug 16 screwed into the end of the casing 10 opposite the bearing 12. The plug 16 may be adjusted for taking up end thrust of the shaft 13, and may be locked in any adjusted position by means of a set screw 17.

Mounted on the screw-threaded portion 15 of the shaft 13 is a sliding sleeve or nut 18. Formed on the sleeve 18, at one side thereof, is a toothed rack 19. In this connection it should be mentioned that on the opposite side the sleeve 18 is split, as shown at 20 in Fig. 4, and is provided with adjacent laterally extending flanges 21 which are adjustably locked together by means of bolts 22. It will be seen that by adjustment of the bolts 22 the sleeve 18 can be tightened on the screw-threaded portion 15 of the shaft 13 for taking up any play between the parts.

Formed in the adjacent edges of the flanges 21 are rabbets or grooves 23, which register with each other and receive an adjusting bar or strip 24. In the outer surface of the bar or strip 24 are cup-shaped recesses 25.

Adjustably mounted in the side wall of the casing 10 are set screws 26, the inner ends of which rest in cup-shaped washers 27 in the recesses 25. The bar 24, which is adjustable, will take up any side thrust of the sleeve or nut 18.

In the top and bottom surfaces of the sleeve 18 are grooves 28, in which are received bars or strips 29 which are adjustably held in position by set screws 30 mounted in the top and bottom walls of the casing 10 and connected with the bars 29 in the same manner that the set screws 26 are connected with the bar 24.

It will be seen that the bars 29 form means for holding the sleeve 18 against any up-and-down play, and that the bars 29 and 24 hold the sleeve 18 against play in any direction. These bars are readily adjustable to take up any play that might result from wear of the parts, and it is readily seen that on account of the use of the cup-shaped washers 27 the adjustment of the bars may be very accurate and complete.

Mounted in bearings formed at the upper and lower portions of the casing 10 and the removable member 11, is a shaft 31, on the lower end of which is mounted the steering arm 32 with a ball 33 on the end thereof. Fixed on the shaft 31 within the casing, is a segmental pinion 34, which is provided, over a portion of its periphery, with teeth 35 in mesh with the teeth 19 on the sleeve 18. A portion of the removable casing member 11 forms a bearing 36 for the upper part of the segmental gear 34, and between the bearing member 36 and the smooth portion of the periphery of the pinion 34 is a Babbitt bushing 37.

In the practical operation of the device, it will, of course, be understood that the steering arm 32 is connected with the connecting rod of a motor vehicle in the ordinary way, and that the shaft 13 is connected with the main steering rod in a suitable way.

When the shaft 13 is rotated, the sleeve 18 will be moved longitudinally thereon by the coaction of the threads on the shaft 13 with the threads on the interior of the sleeve 18, for imparting rocking movement to the segmental gear 34 and thereby rocking the shaft 31 and imparting reciprocatory swinging movement to the steering arm 32.

My improved universal compound worm steering gear has all the advantages of the worm gear steering mechanism, in that the shaft 13 may be easily rotated for imparting swinging movement to the steering arm 32, whereas movement of the steering arm 32 cannot impart rotation to the shaft 13. In other words, my steering gear is irreversible.

One of the difficulties experienced in the use of worm steering gears, arises from the fact that after a certain amount of wear occurs, the result is considerable play among the various parts, with all the evils attendant upon loose parts. With my means for mounting the operative parts of the worm gear mechanism, it will be seen that a ready and easy adjustment is possible for taking up any play of loose parts.

It will be noted that adjustment or tightening of the sleeve 18 on the threads of the shaft 13 is provided for by means of the bolts 22. Adjustment of the sleeve 18 to take up side thrust and wear, is also afforded by the bar 24 and the set screws 26.

Similarly, any tendency of the sleeve 18 to rock vertically, due to any looseness of the parts arising from any cause, may be counteracted by the adjustment of the bars 29 by means of the set screws 30. It will thus be seen that I have solved the problem of building a steering gear of the worm type, and providing means for adjusting the parts so as to take up all play that might otherwise occur from wear or other causes.

It will, of course, be understood that suitable flanges 40 may be provided on the casing 10 in any suitable place, for properly mounting the casing 10 on different kinds of machines.

In the bearing 12 is formed a passage 41 for the feed control rod. On the upper surface of the casing 10 is provided a suitable lug 42, with an opening 43 therein, forming a bearing for the lower end of the spark control rod.

It will be understood that some changes may be made in the details of the construction and arrangement of the parts of my device, without departing from the essential features and purposes of my invention, and it is my intention to cover by my claims, any modified forms of structure or use of mechanical equivalents which may be reasonably included within their scope.

I claim as my invention:

1. In a device of the class described, a casing having formed at one end thereof a bearing, a plug adjustably mounted in the opposite end of said casing, forming an alined bearing, a shaft mounted in said bearings, having a screw-threaded portion within the casing, an internally screw-threaded sleeve split on one side, mounted on said screw-threaded portion of said shaft, having teeth on one surface, flanges formed on said sleeve adjacent to the split therein, adjustable means for drawing said flanges together, a bar inset in said flanges, set screws for adjustably holding said bar in position, bars inset in the upper and lower surfaces of said sleeve, set screws for adjustably holding said last described bars in position, and means for operatively connecting said sleeve with a steering arm.

2. In a device of the class described, a casing having formed at one end thereof a bearing, a plug adjustably mounted in the opposite end of said casing, forming an alined bearing, a shaft mounted in said bearings, having a screw-threaded portion within the casing, an internally screw-threaded sleeve split on one side, mounted on said screw-threaded portion of said shaft, having teeth on one surface, flanges formed on said sleeve adjacent to the split therein, adjustable means for drawing said flanges together, a bar inset in said flanges, set screws for adjustably holding said bar in position, bars inset in the upper and lower surfaces of said sleeve, set screws for adjustably holding said last described bars in position, said bars having cup-shaped recesses, cup-shaped washers interposed between said set screws and said bars, and means for operatively connecting said sleeve with a steering arm.

3. In a device of the class described, a casing having formed at one end thereof a bearing, a plug adjustably mounted in the opposite end of said casing, forming an alined bearing, a shaft mounted in said bearings, having a screw-threaded portion within the casing, an internally screw-threaded sleeve split on one side, mounted on said screw-threaded portion of said shaft, having teeth on one surface, flanges formed on said sleeve adjacent to the split therein, adjustable means for drawing said flanges together, a bar inset in said flanges, set screws for adjustably holding said bar in position, bars inset in the upper and lower surfaces of said sleeve, set screws for adjustably holding said last described bars in position, and means for operatively connecting said sleeve with a steering arm, said means comprising a shaft, a segmental gear thereon meshing with the teeth on said sleeve, and a bushing interposed between said segmental gear and said casing.

4. In a device of the class described, a casing, a shaft rotatably mounted therein, having screw threads on its portion within the casing, an internally screw-threaded sleeve mounted on said screw threads, having teeth on one side, a segmental gear having teeth meshing with said first teeth, means for operatively connecting said segmental gear with a steering arm, a bar inset in said sleeve on the side thereof opposite said segmental gear, and adjustable means for holding said bar in position.

5. In a device of the class described, a casing, a shaft rotatably mounted therein, having a worm formed thereon within the casing, an internally screw-threaded sleeve mounted on said worm, having teeth on one side, a segmental gear having teeth meshing with said first teeth, means for affording limited adjustment of said sleeve on said worm toward said segmental gear, and means for affording limited adjustment of said sleeve on said worm at right angles to the direction of said first described adjustment, whereby any rocking of the sleeve on the shaft may be prevented, and any play of the parts may be taken up.

Des Moines, Iowa, April 24, 1918.

FRANCIS B. ALLDREDGE.